US008918899B2

(12) United States Patent
Furuichi et al.

(10) Patent No.: US 8,918,899 B2
(45) Date of Patent: Dec. 23, 2014

(54) INFORMATION PROCESSING DEVICE, CONTROL METHOD AND PROGRAM

(71) Applicant: International Business Machines Corporation, Armonk, NY (US)

(72) Inventors: Sanehiro Furuichi, Tokyo (JP); Masami Tada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/688,500

(22) Filed: Nov. 29, 2012

(65) Prior Publication Data

US 2013/0145459 A1 Jun. 6, 2013

(30) Foreign Application Priority Data

Dec. 5, 2011 (JP) ................................ 2011-265908

(51) Int. Cl.
*G06F 21/00* (2013.01)
*G06F 21/34* (2013.01)

(52) U.S. Cl.
CPC ........ *G06F 21/34* (2013.01); *G06F 2221/2111* (2013.01)
USPC ......................................................... 726/27

(58) Field of Classification Search
CPC ..... G06F 21/12; G06F 21/121; G06F 21/123; G06F 21/805
USPC .............................................. 726/26, 27, 34
See application file for complete search history.

(56) References Cited

U.S. PATENT DOCUMENTS

| | | | |
|---|---|---|---|
| 6,275,933 B1 | 8/2001 | Fine et al. | |
| 6,988,210 B1 * | 1/2006 | Audebert | ........................ 726/9 |
| 8,335,869 B2 | 12/2012 | Koike et al. | |
| 2005/0273845 A1 | 12/2005 | Urano et al. | |
| 2009/0024771 A1 | 1/2009 | Koike et al. | |
| 2010/0211488 A1 * | 8/2010 | McSpadden et al. | ........... 705/34 |

FOREIGN PATENT DOCUMENTS

| | | |
|---|---|---|
| EP | 1271277 A2 | 1/2003 |
| GB | 2320597 A | 6/1998 |
| JP | 2002298097 A | 10/2002 |
| JP | 2008129647 A | 6/2008 |
| JP | 2009044764 A | 2/2009 |
| JP | 2009301539 A | 12/2009 |
| JP | 2010146125 A | 7/2010 |

OTHER PUBLICATIONS

UK search report dated May 8, 2013 regarding application GB1221250.2, reference JP920110122GB1, applicant International Business Machines Corporation, 8 pages.

* cited by examiner

*Primary Examiner* — Edward Zee
(74) *Attorney, Agent, or Firm* — Yee & Associates, P.C.; Jeffrey S. LaBaw

(57) ABSTRACT

An information processing device, control method and program that suppresses security risks to a minimum. When power is activated, a control component starts by reading a first program from a first memory component and, in observance of the first memory program, it reads the identification information of an authentication device that is mounted to a mounting component, references a table T, and performs authentication processing for the authentication device, with the condition that the count value correspondingly listed for the identification information of the authentication device be larger than a prescribed value and, when authentication processing has succeeded, starts by reading the second program from a second memory component, and in the event that the authentication device continues to be mounted to the mounting component during executing the second program, decreases the table count value corresponding to the unique identification information of the authentication device.

17 Claims, 4 Drawing Sheets

| Identification Information | Count Value | Maximum Value |
|---|---|---|
| IBM_12345 | 240 | 300 |
|  |  |  |
|  |  |  |
|  |  |  |
|  |  |  |

Fig. 5

| Identification Information | Count Value 1 / Maximum Value | Count Value 2 / Maximum Value | Count Value 3 / Maximum Value |
|---|---|---|---|
| IBM_12345 | 1000/3000 | 200/250 | 240/300 |
|  |  |  |  |
|  |  |  |  |
|  |  |  |  |
|  |  |  |  |

INFORMATION PROCESSING DEVICE, CONTROL METHOD AND PROGRAM

TECHNICAL FIELD

This invention relates to information processing devices that possess an authentication processing function, and to control methods and programs for such information processing systems.

BACKGROUND ART

Technology exists for controlling the operation of application programs installed on a computer (refer to Patent Literature 1, for example). Specifically, there exist systems that execute such control by performing authentication with a universal serial bus (USB) key or USB token having a USB interface.

For example, there exists a system that mounts a USB key to the USB port of a personal computer (PC), performs authentication, and allows use of the computer only within the time that the USB key is mounted (hereafter, called the "first system").

In addition, there exists a system that mounts a USB key to the USB port of a PC, performs authentication through a network, and administers an effective period at the server side (hereafter, called the "second system").

CITATION LIST

Patent Literature

Patent Literature 1: Japan Unexamined Patent Application Publication 2010-146125

Technical Problems

However, the first system is positioned as a substitutional method for a password, having a uniform effect as a measure against loss or theft of the PC, but there is not considered the scenario in which the PC is lost or stolen with the USB key mounted. Moreover, there is a high likelihood of loss or theft with the USB key mounted to the PC, conversely increasing the security risk.

With the second system, a connection to a network is required, and so it is not able to administer an effective period with a single unit (standalone unit).

SUMMARY OF INVENTION

This invention has as one purpose the offering of an information processing device, control method and program that suppresses security risks to a minimum by possessing a function to perform authentication processing by utilizing an information processing device such as a USB key.

In order to solve the above described problem, the information processing device according to this invention is an information processing device that performs authentication processing with there being mounted an authentication device that securely stores unique identification information, and it has a structure that provides a mounting component by which the authentication device is mounted, a first memory component in which a first program is stored, a second memory component in which a second program is stored, a third memory component in which is stored a table with correspondent listing of the unique identifier information of the authentication device and a count value, and a control component that, when power is activated, starts by reading the first program from the first memory component and, in observance of the first memory program, reads the identification information of the authentication device that is mounted to the mounting component, references the table, and performs authentication processing for the authentication device, with the condition that the count value correspondingly listed for the identification information of the authentication device be larger than a prescribed value and, when authentication processing has succeeded, starts by reading the second program from the second memory component, and in the event that the authentication device continues to be mounted to the mounting component during executing the second program, decreases the table count value that corresponds to the unique identification information of the authentication device.

With this information processing device, the structure is also acceptable wherein, when an authentication device is not mounted to the mounting component, or when the control component has referenced the table and judged that the count value correspondingly listed for the identification information of the authentication device is at or below the prescribed value, or when authentication processing performed for the authentication device mounted to the mounting component has failed, the control component controls so as to not start the second program.

With this information processing device, the structure is also acceptable wherein the control component, during executing the second program, at a prescribed time requests re-authentication for the authentication device, references the table, performs authentication processing for the authentication device, with the condition that the count value correspondingly listed for the identification information of the authentication device be larger than a prescribed value and, when authentication processing has succeeded, continues execution of the second program.

With this information processing device, the structure is also acceptable wherein, at the time that re-authentication has been requested, when an authentication device is not mounted to the mounting component, or when the control component has referenced the table and judged that the count value correspondingly listed for the identification information of the authentication device is at or below a prescribed value, or when an authentication device is mounted to the mounting component but re-authentication processing performed for the authentication device has failed, the control component restricts or stops execution of the second program.

With this information processing device, the structure is also acceptable wherein the control component, during executing the second program, under the condition that the authentication device not be mounted to the mounting component, increases the table count value corresponding to the unique identification information of the authentication device.

With this information processing device, the structure is also acceptable wherein the control component, when during executing the second program it has been judged that the application program to be executed is a prescribed application program, controls so as to not decrease the table count value corresponding to the unique identification information of the authentication device, even when the authentication device continues to be mounted to the mounting component.

With this information processing device, the structure is also acceptable wherein the control component controls so as to display with prescribed timing on a display component a confirmation message that questions the presence or absence of continued use of a prescribed application program.

In order to solve the above described problems, the control method according to this invention is an authentication method that performs authentication processing with an information processing device by using an authentication device that securely stores unique identification information, and has a structure that provides a first start step that, at the time that power for the information processing device is activated, starts by reading a first program, a judgment step that, in observance of the first program, reads the identification information of the authentication device mounted to the mounting component of the information processing device, references the table which correspondingly lists the unique identification information of the authentication device and a count value, and judges whether or not the count value correspondingly listed for the identification information of the authentication device is larger than a prescribed value, an authentication processing step that, when the count value from the judgment step is judged to be larger than the prescribed value, performs authentication processing for the authentication device mounted to the mounting component, a second start step that, when authentication processing has succeeded, starts by reading a second program, and a decrease step that, in the event that the authentication device continues to be mounted during executing the second program, decreases the table count value corresponding to the unique identification information of the authentication device.

In order to solve the above described problems, the program according to this invention is a program that by a computer provides authentication processing by using an authentication device that securely stores unique identification information, and by a computer provides a first start step that, at the time that power for the information processing device is activated, starts by reading a first program, a judgment step that, in observance of the first program, reads the identification information of the authentication device mounted to the mounting component of the information processing device, references the table which correspondingly lists the unique identification information of the authentication device and a count value, and judges whether or not the count value correspondingly listed for the identification information of the authentication device is larger than the prescribed value, an authentication processing step that, when the count value from the judgment step is judged to be larger than a prescribed value, performs authentication processing for the authentication device mounted to the mounting component, a second start step that, when authentication processing has succeeded, starts by reading a second program, and a decrease step that, in the event that the authentication device continues to be mounted during executing the second program, decreases the table count value corresponding to the unique identification information of the authentication device.

By use of this invention, there is an ability to suppress security risks to a minimum.

BRIEF DESCRIPTION OF DRAWINGS

FIG. 5 is a drawing that shows typically another structural example of the table.

DESCRIPTION OF EMBODIMENT

The following section describes an embodiment of this invention by referencing the drawings.

Figures 1, 2:
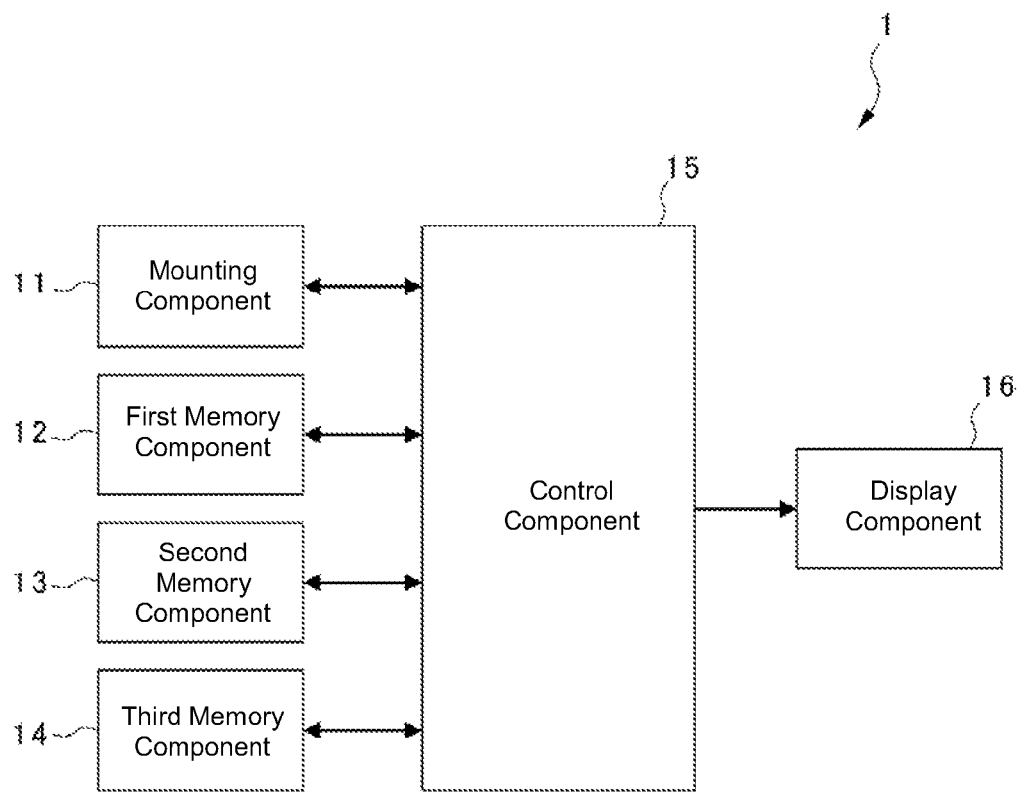
FIG. 1 is a drawing that shows the structure of the information processing device of this invention.
FIG. 2 is a drawing that shows typically the structure of the table.

FIG. 1 is a drawing that shows the structure of information processing device 1. Information processing device 1 is a device that performs authentication processing with there being mounted authentication device 2 (not illustrated in FIG. 1, but see FIG. 3) that is attached to mounting component 11 and securely stores unique identification information.

With this embodiment, authentication device 2 is described as a USB (Universal Serial Bus) token, but there is no such limitation. Authentication device 2 can also be such as a USB key, for example, as long as it is an item that securely stores unique identification information.

As shown in FIG. 1, information processing device 1 provides mounting component 11, first memory component 12, second memory component 13, third memory component 14, control component 15, and display component 16.

Mounting component 11 is an interface conforming to a prescribed standard (USB, for example), and authentication device 2 is mounted to it.

Within first memory component 12 is stored a first program. First memory component 12 is structured by ROM (Read Only Memory). The first program is a BIOS (Basic Input/Output System) program, and it is a program that performs initialization of information processing device 1.

Within second memory component 13 is stored a second program. Second memory component 13 is structured by an HDD (hard disk drive), for example, although it may be structured of a flash memory. The second program is an OS (operating system) program, which is foundational software.

Within third memory component 14 is stored table T in which are correspondingly listed unique identification information for authentication device 2 and a count value. With this embodiment, third memory component 14 is described as an independent memory component, but there is no such limitation, and it can have a structure identical to that of second memory component 13.

FIG. 2 is a drawing that shows typically table T. Table T is a table that administers the effective period for the unrestricted use of the second program, and it is structured by unique identification information for authentication device 2, a count value, and a maximum value. The unique identification information for authentication device 2 is a manufacturing number, for example. The count value is that which designates the time for continued use of information processing device 1, and a single count is a single second, for example. The maximum value is the upper limit for the count value.

Authentication device 2 is registered in table T by performing in advance a prescribed registration process within information processing device 1. For example, an administrator starts information processing device 1, executes the registration application, and performs operations according to the application instructions for registration. By using this registration process, within table T there is registered authentication device 2, which is the registration target.

At the time that power is activated, control component 15 starts by reading the first program from first memory component 12 and, in observance of the first program, it reads the identification information of authentication device 2 that is mounted to mounting component 11, references table T, and judges whether or not the count value correspondingly listed for the identification information of authentication device 2 is larger than a prescribed value.

When control component 15 has judged that the count value is larger than a prescribed value, it performs authentication processing for authentication device 2. When authentication processing has succeeded, control component 15 starts by reading the second program from second memory component 13. Authentication processing is processing that utilizes PKI, for example.

In the event that authentication device 2 continues to be mounted to mounting component 11 during executing the second program, control component 15 decreases the table T count value corresponding to the unique identification information of authentication device 2. For example, control component 15 decreases the count value by a fixed percentage, based on the time that authentication device 2 is mounted to mounting component 11.

By structuring in this way, during the time of power activation, information processing device 1 is capable of prompting the user to mount a valid authentication device 2 to mounting component 11; and, if authentication device 2 continues to be mounted to mounting component 11, the table T count value is progressively decreased, thereby providing the ability to prompt the user to remove authentication device 2 from mounting component 11 at the time that authentication has ended. Accordingly, there is capability to avoid the situation in which information processing device 1 is expropriated by another user after being left unattended with authentication device 2 in the mounted condition, and this suppresses security risks to a minimum.

In addition, the above explanation described a structure and operation of information processing device 1, but there is no such limitation, and it is acceptable to provide other structural elements, structuring as a control method or program capable of suppressing security risks to a minimum.

It is also acceptable to structure such that, when authentication device 2 is not mounted to mounting component 11, or when control component 15 has referenced table T and judged that the count value correspondingly listed for the identification information of authentication device 2 is at or below the prescribed value, or when authentication processing performed for authentication device 2 mounted to mounting component 11 has failed, control component 15 controls so as to not execute the second program.

Specifically, at power activation, control component 15 starts by reading the first program from first memory component 12 and, in observance of the first program, it confirms whether or not authentication device 2 is mounted to mounting component 11. When authentication device 2 is not mounted to mounting component 11, control component 15 terminates processing without executing the second program. Furthermore, it is also acceptable for control component 15 to display a message such as "Please mount authentication device 2" in display 16 when authentication device 2 is not mounted to mounting component 11.

Additionally, control component 15 references table T, and when the count value correspondingly listed for the identification information of authentication device 2 is at or below the prescribed value, control component 15 terminates processing without executing the second program. With this embodiment, the count value for the prescribed value is presumed to be "0", but it can be other than this. In addition, control component 15 can display a message such as "Please mount authentication device 2" in display 16.

When authentication processing performed for authentication device 2 mounted to mounting component 11 has failed, control component 15 terminates processing without executing the second program, even if the count value is larger than the prescribed value. In addition, control component 15 can display a message such as "Please mount authentication device 2" in display 16.

By structuring in this way, because information processing device 1 also will not start the second program when the count value is at or below the prescribed value, there is at least an ability to prompt the user to remove authentication device 2 from mounting component 11 at the time that authentication has ended. Accordingly, there is capability to avoid the situation in which information processing device 1 is expropriated by another user after being left unattended with authentication device 2 in the mounted condition, and this suppresses security risks to a minimum.

It is also acceptable to structure such that control component 15, during executing the second program, at a prescribed time requests re-authentication for authentication device 2, references table T, and performs authentication processing for authentication device 2 under the condition that the count value correspondingly listed for identification information of authentication device 2 be larger than a prescribed value and, when authentication processing has succeeded, continues to execute the second program.

For the prescribed time, there can be considered a fixed time period (10 minutes or 20 minutes, for example) or the time at which a specific application is started. Furthermore, a fixed time period could be freely set by the user.

It is also acceptable for control component 15 to change the request for re-authentication according to the location at which information processing device 1 is placed. For example, when control component 15 has judged that information processing device 1 is within the company, it does not issue a request for re-authentication, but when it has judged that information processing device 1 is outside the company, it issues a request for re-authentication with a prescribed timing.

It is also acceptable for control component 15 to be structured to judge whether or not information processing device 1 is within the company or outside the company by determining whether the network is in the online condition or in the offline condition. Furthermore, this structure is an example, and there is no such limitation, with it being acceptable to structure control component 15 to judge whether information processing device 1 is within the company or outside the company by using a built-in GPS function.

By structuring in this way, information processing device 1 is capable of improving security by requesting at a prescribed time re-authentication; and, when the count value is larger than a prescribed value and re-authentication has succeeded, there is continuation of execution of the second program, and therefore ability to prompt the user to remove authentication device 2 from mounting component 11 at the time that authentication has ended. Accordingly, there is capability to avoid the situation in which information processing device 1 is expropriated by another user after being left unattended with authentication device 2 in the mounted condition, and this suppresses security risks to a minimum.

It is also acceptable to structure such that control component 15, when authentication device 2 is not mounted to mounting component 11 at the time of requesting re-authentication, or when control component 15 has referenced the table and judged that the count value correspondingly listed for the identification information of authentication device 2 is at or below the prescribed value, or when authentication device 2 is mounted to the mounting component but re-authentication processing performed for authentication device 2 has failed, restricts or stops execution of the second program.

Restricting or stopping the execution of the second program signifies locking the screen displayed in display component 16 or forcibly shutting down power, for example. It is further acceptable for control component 15 to forego immediate restricting or stopping execution of the second program and to instead restrict or stop execution of the second program after displaying a message such as "Restricting use after XX seconds (minutes)" in display component 16.

It is also acceptable to structure such that control component 15, when during screen lock the count value correspondingly listed for the identification information of authentication device 2 becomes larger than the prescribed value and when authentication processing has succeeded, releases the screen lock.

In the event that authentication device 2 continues to be mounted to mounting component 11 during executing the second program, control component 15 decreases the table T count value that corresponds to the unique identification information of authentication device 2, and therefore, if authentication device 2 continues to be mounted, the count value will drop to below the prescribed value and execution of the second program will be restricted or stopped.

By structuring in this way, execution of the second program will be restricted or stopped at the requesting of re-authentication if the count value is at or below the prescribed value, and therefore information processing device 1 is at least capable of prompting the user to remove authentication device 2 from mounting component 11 at the time that authentication has ended. Accordingly, there is capability to avoid the situation in which information processing device 1 is expropriated by another user after being left unattended with authentication device 2 in the mounted condition, and this suppresses security risks to a minimum.

It is also acceptable to structure such that control component 15, during executing the second program, under the condition that authentication device 2 not be mounted to mounting component 11, increases the table T count value corresponding to the unique identification information of authentication device 2.

For example, control component 15 can increase the count value by a fixed percentage, based on the time during which authentication device 2 has not been mounted to mounting component 11. However, control component 15 executes the increase within a range that does not exceed the maximum value regulated by table T.

By structuring in this way, even when the remaining count value has become small, the count value recovers due to authentication device 2 having been removed from mounting component 11, and therefore information processing device 1 is capable of prompting the user to remove authentication device 2 from mounting component 11 at the time that authentication has ended. In addition, there is capability to avoid the situation in which information processing device 1 is expropriated by another user after being left unattended with authentication device 2 in the mounted condition, and this suppresses security risks to a minimum.

It is also acceptable to structure such that control component 15, when during executing the second program it has been judged that the application program to be executed is a prescribed application program, controls so as to not decrease the table count value corresponding to the unique identification information of authentication device 2, even if authentication device 2 continues to be mounted to the mounting component.

The prescribed application program would be an application program registered in advance and, for example, it would be an application program that cannot start without a hardware key called a dongle being connected to a prescribed port in order to prevent unauthorized copying, or an application program that cannot be used without authentication device 2 being connected to mounting component 11.

By structuring in this way, information processing device 1 permits continued mounting of authentication device 2 to mounting component 11 only under a fixed condition, and in other than this condition, the count value is progressively decreased if authentication device 2 continues to be mounted to mounting component 11. Accordingly, there is a benefit in preventing loss of user operability because information processing device 1 can execute other processing under the fixed condition. In addition, information processing device 1 is capable of prompting the user to remove authentication device 2 from mounting component 11 when outside the fixed condition, and this suppresses security risks to a minimum.

It is also acceptable to structure such that control component 15 controls so as to display in display component 16 at a prescribed time a confirmation message that questions the presence or absence of continued use of a prescribed application program.

For the prescribed time, there can be considered such as a fixed time period (10 minutes or 20 minutes, for example). Furthermore, the fixed time period can be set by the user.

By structuring in this way, there is capability to provide a cautionary alert when, with the prescribed application program in the started condition, the user utilizes another application program.

The following section describes specific functions of control component 15.

Figure 3:
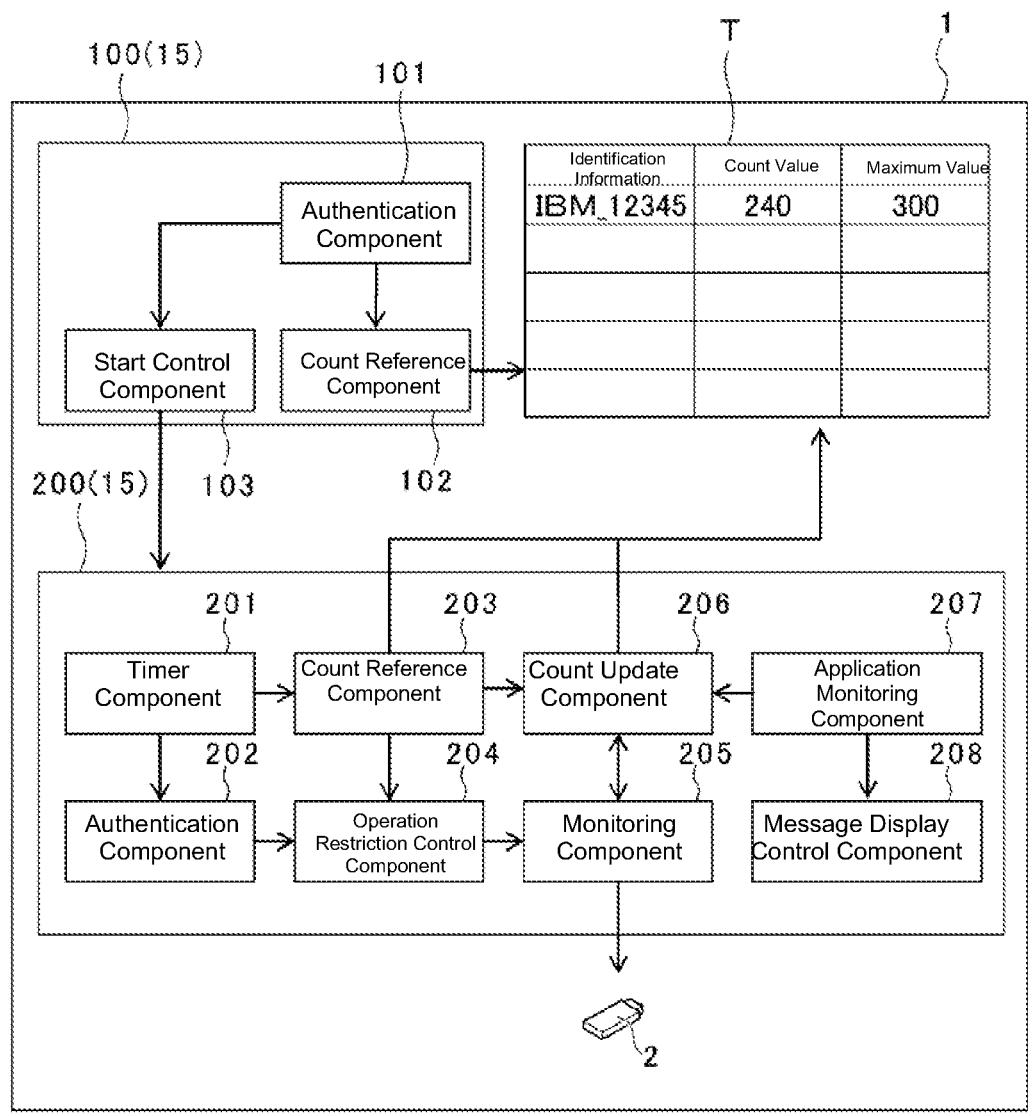
FIG. 3 is a function block diagram that shows the specific structure for the control component during first program execution and shows the specific structure for the control component during second program execution.

FIG. 3 is a functional block diagram that shows the specific structure of control component 15 during first program execution and shows the specific structure of control component 15 during second program execution. Hereafter, the structure during first program execution is called first program side 100, and the structure during second program execution is called second program side 200. Additionally, hereafter, information processing device 1 is presumed to be in the start condition, with power activated and with the first program having been read from first memory component 12.

As shown in FIG. 3, control component 15 provides, at first program side 100 (depicted by reference numeral 100(15) in FIG. 3), authentication component 101, count reference component 102, and second program start control component (hereafter, called start control component) 103.

In observance of the first program, authentication component 101 performs authentication of whether or not authentication device 2 is mounted to mounting component 11, and it reads the identification information for authentication device 2 that is mounted. Authentication component 101 issues a command to count reference component 102 to read from table T the count value that corresponds to the pertinent identification information.

In observance of this command, count reference component 102 reads from table T the count value that corresponds to the identification information and sends it to authentication component 101.

Authentication component 101 judges whether or not the count value correspondingly listed for the identification information of authentication device 2 is larger than the prescribed value. If it is judged that the count value is larger than the prescribed value, authentication component 101 performs authentication processing for authentication device 2. When authentication processing has succeeded, authentication component 101 conveys that fact to start control component 103.

With authentication processing success at authentication component 101 taken as an opportunity, start control component 103 starts by reading the second program from second memory component 13.

In addition, as shown in FIG. 3, control component 15 provides, at second program side 200 (depicted by reference numeral 200(15) in FIG. 3), timer component 201, authentication component 202, count reference component 203, operation restriction control component 204, monitoring component 205, count update component 206, application monitoring component 207, and message display control component 208.

Timer component 201 uses the system clock to measure the time from start of the second program. When timer component 201 has judged that, from the time of second program start, there has expired a time period that has been set (10 minutes, for example), it sends a timing signal to authentication component 202 and to count reference component 203.

In response to the timing signal sent from timer component 201, authentication component 202 requests re-authentication for authentication device 2. When authentication processing has not succeeded, authentication component 202 sends to operation restriction control component 204 a signal showing that authentication has failed.

In response to the timing signal sent from timer component 201, count reference component 203 references table T and judges whether or not the count value correspondingly listed for the identification information of authentication device 2 is larger than the prescribed value. When count reference component 203 has judged that the count value is at or under the prescribed value, it sends to operation restriction control component 204 a signal showing that the count value is at or under the prescribed value.

When operation restriction control component 204 receives a signal showing that authentication has failed or a signal showing that the count value is at or under the prescribed value, it restricts or stops execution of the second program. Specifically, operation restriction control component 204 locks the screen displayed on display component 16 or forcibly shuts down power.

Monitoring component 205 monitors the mounting condition for mounting component 11 relative to authentication device 2. Specifically, in the event that authentication device 2 continues to be mounted to mounting component 11 after expiration of a prescribed time (1 minute, for example), based on that mounting time, monitoring component 205 sends to count update component 206 a count decrease signal. Conversely, when authentication device 2 has been removed from mounting component 11, based on that unmounted time, monitoring component 205 sends to count update component 206 a count increase signal.

Based on a count decrease signal, count update component 206 decreases the table T count value corresponding to the unique identification information of authentication device 2. As an example, monitoring component 205 sends to count update component 206 a count decrease signal each time the mounted time surpasses 1 minute. At the time that it has received the count decrease signal, count update component 206 decreases by 1 count the table T count value. Accordingly, with information processing device 1, in the event that authentication device 2 continues to be mounted to mounting component 11 for 60 minutes, the table T count value is decreased by 60 counts.

Additionally, based on a count increase signal, count update component 206 increases the table T count value corresponding to the unique identification information for authentication device 2. As an example, monitoring component 205 sends to count update component 206 a count increase signal each time the unmounted time surpasses 1 minute. At the time that it has received the count increase signal, count update component 206 increases by 1 count the table T count value. Accordingly, with information processing device 1, when authentication device 2 is not mounted to mounting component 11 for 60 minutes, the table T count value is increased by 60 counts. In addition, the count value is increased within a range that does not exceed the maximum value regulated by table T.

Application monitoring component 207 monitors the start condition of a prescribed program that has been registered in advance and, in the event that the application has been started, it controls count update component 206 to not decrease the table T count value, even when authentication device 2 continues to be mounted to mounting component 11.

When the count update function of count update component 206 is controlled by application monitoring component 207, message display control component 208 periodically controls to display in display component 16 a confirmation message that questions the presence or absence of continued use of a prescribed application program.

By structuring in this way, when power is activated, information processing device 1 is able to prompt the user to mount a valid authentication device 2 to mounting component 11 and, if authentication device 2 continues to be mounted to mounting component 11, the table T count value is decreased, thereby enabling prompting of the user to remove authentication device 2 from mounting component 11 at the time that authentication has ended. Accordingly, there is capability to avoid the situation in which information processing device 1 is expropriated by another user after being left unattended with authentication device 2 in the mounted condition, and this suppresses security risks to a minimum.

Figure 4:
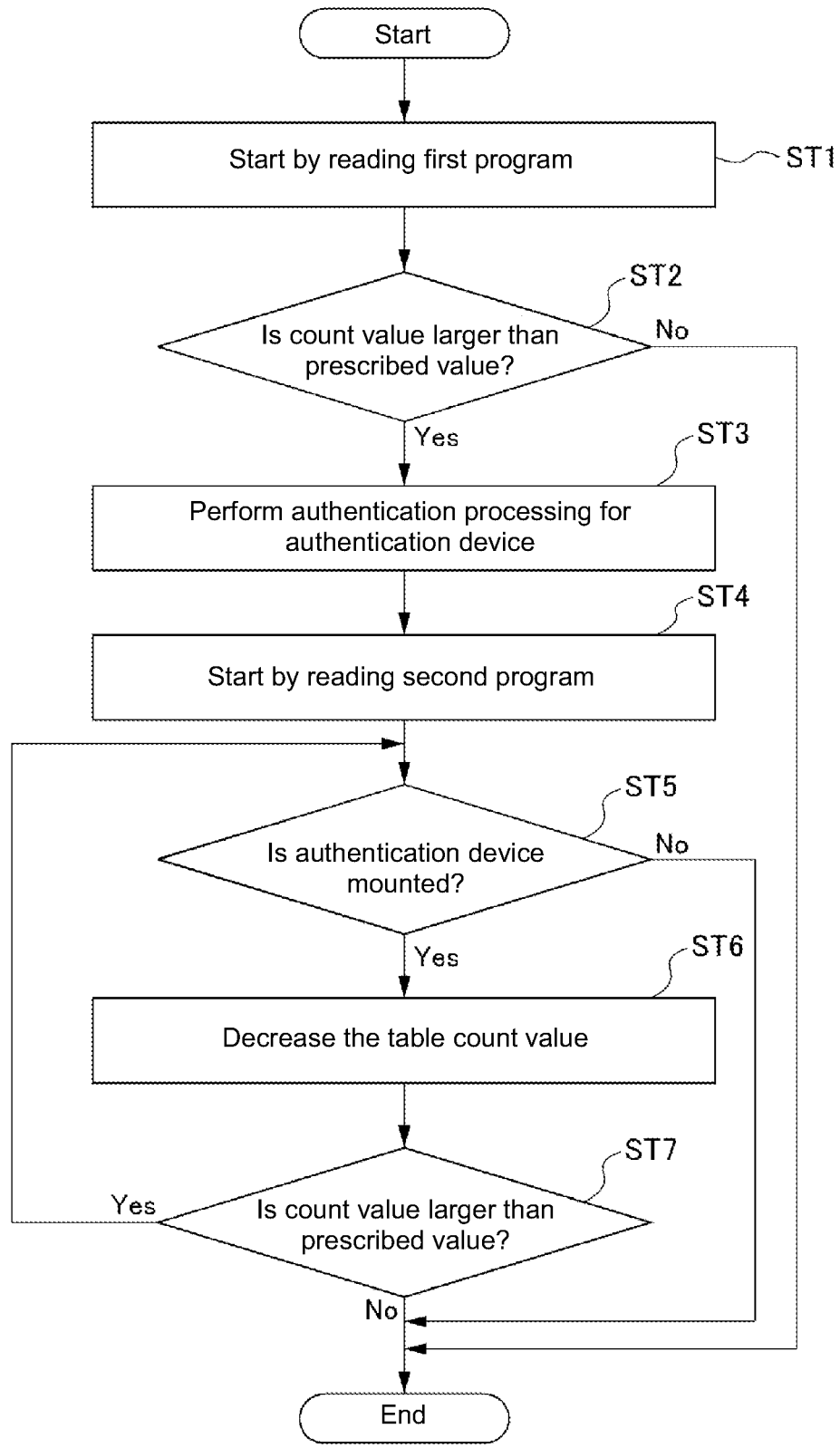
FIG. 4 is a flow chart that provides an explanation of the flow of operations of the information processing device of this invention.

The following section describes the flow of operations for information processing device 1 by referencing the flow chart shown in FIG. 4.

At Step ST1, when power for information processing device 1 is activated, control component 15 starts by reading the first program.

At Step ST2, in observance of the first program, control component 15 (authentication component 101) reads the identification information for authentication device 2 mounted to mounting component 11, references table T, and judges whether or not the count value correspondingly listed for the identification information for authentication device 2 is larger than the prescribed value. If the value is larger than the prescribed value (Yes), the process advances to Step ST3; if the value is at or below the prescribed value (No), the entire processing series is terminated. Furthermore, when the value is at or under the prescribed value, before termination of the entire processing series, it is acceptable to execute authentication processing for a quantity of retries or to request replacement of authentication device 2.

At Step ST3, when by Step ST2 it has by judged that the count value is larger than the prescribed value, control component 15 (authentication component 101) executes authentication processing for authentication device 2 mounted to mounting component 11 of information processing device 1.

At Step ST4, when the authentication processing has succeeded, control component 15 (start control component 103) starts by reading the second program. Conversely, when authentication processing has failed, control component 15 does not read the second program but instead allows a quantity of retries for authentication processing or requests replacement of authentication device 2, and then displays the fact that authentication processing has failed and executes shutdown, for example.

At Step ST5, control component 15 (monitoring component 205) judges whether or not authentication device 2 is mounted. If it judges that authentication device 2 is mounted to mounting component 11 (Yes), the process advances to Step ST6; if it judges that authentication device 2 has been removed from mounting component 11 (No), it terminates the entire processing series.

At Step ST6, because authentication device 2 continues to be mounted to mounting component 11 during executing the second program, control component 15 (count update component 206) decreases the table T count value corresponding to the unique identification information for authentication device 2.

At Step ST7, control component 15 (count reference component 203) judges whether or not the table T count value is larger than the prescribed value. If it has judged that the count value is larger than the prescribed value (Yes), the process returns to Step ST5. Conversely, if it has judged that the count value is at or under the prescribed count value (No), it terminates the entire processing series. In such a case, control component 15 (count reference component 203) sends to operation restriction control component 204 a signal to show that the count value is at or under the prescribed value. Operation restriction control component 204 then restricts or stops execution of the second program. Specifically, operation restriction control component 204 locks the screen being displayed on display component 16 or forcibly shuts down power.

By structuring in this way, when power is activated, information processing device 1 is able to prompt the user to mount a valid authentication device 2 to mounting component 11; and, if authentication device 2 continues to be mounted to mounting component 11, the table T count value is decreased, thereby enabling prompting of the user to remove authentication device 2 from mounting component 11 at the time that authentication has ended. Accordingly, there is capability to avoid the situation in which information processing device 1 is expropriated by another user after being left unattended with authentication device 2 in the mounted condition, and this suppresses security risks to a minimum.

Furthermore, the structure of table T shown in FIG. 2 is an example, and there is no such limitation. FIG. 5 is a drawing that shows typically another structure for table T.

As shown in FIG. 5, table T can be structured to possess a plurality count values, with each corresponding to an application program. With the example of FIG. 5, relative to authentication device 2 having specific identification information (IBM12345), there is a count value 1 and corresponding a maximum value set for a first application program (the application program used in the drawings, for example), there is a count value 2 and a corresponding maximum value set for a second application program (an application program for accessing an external DB, for example), and there is a count value 3 and a corresponding maximum value set for a third application program (another application program, for example).

By structuring in this way, information processing device 1 has an ability to separately administer the continuous mounting time for authentication device 2 according to the application program.

Additionally, there can be registered a plurality of authentication device 2 units in table T. Accordingly, information processing device 1 has the ability to administer multiple users by utilization of the multiple units of authentication device 2.

REFERENCE SIGNS LIST

1 Information Processing Device
2 Authentication Device
11 Mounting Component
12 First Memory Device
13 Second Memory Device
14 Third Memory Device
15 Control Component
16 Display Component
100 First Program Side
101, 202 Authentication Component
102, 203 Count Reference Component
103 Start Control Component
200 Second Program Side
201 Timer Component
204 Operation Limitation Control Component
205 Monitoring Component
206 Count Update Component
207 Application Monitoring Component
208 Message Display Control Component

We claim:

1. An information processing device that is operable to perform authentication processing and having an authentication device mounted therewith that securely stores unique identification information of the authentication device, comprising:

a mounting component by which the authentication device is mounted;

a first memory component in which a first program is stored;

a second memory component in which the second program is stored;

a third memory component in which is stored a table with a correspondent listing of the unique identification information of the authentication device and a count value; and a control component for starting, when power is activated, the first program from the first memory component, reading the unique identification information of the authentication device that is mounted to the mounting component, referencing the table, and performing authentication processing for the authentication device, with a condition that the count value correspondingly listed for the unique identification information of the authentication device be larger than a prescribed value and when authentication processing has succeeded, starting the second program from the second memory component, and in the event that the authentication device continues to be mounted to the mounting component during executing the second program, decreasing the count value that corresponds to the unique identification information of the authentication device.

2. An information processing device according to claim 1 wherein when the authentication device is not mounted to the mounting component, or when the control component has referenced the table and determined that the count value correspondingly listed for the unique identification information of the authentication device is at or below the prescribed value, or when authentication processing performed for the authentication device mounted to the mounting component has failed, the control component controls so as to not execute the second program.

3. An information processing device according to claim 1 wherein the control component, during executing the second program, at a prescribed time requests re-authentication for the authentication device, references the table, performs authentication processing for the authentication device, with a condition that the count value correspondingly listed for the unique identification information of the authentication device be larger than a prescribed value and, when authentication processing has succeeded, continues execution of the second program.

4. An information processing device according to claim 3 wherein, at a time that re-authentication has been requested, when an authentication device is not mounted to the mounting component, or when the control component has referenced the table and determined that the count value correspondingly listed for the unique identification information of the authentication device is at or below a prescribed value, or when an authentication device is mounted to the mounting component but re-authentication processing performed for the authentication device has failed, the control component restricts or stops execution of the second program.

5. An information processing device according to claim 1 wherein the control component, when executing the second program it is determined that the application program to be executed is a prescribed application program, controls so as to not decrease the count value corresponding to the unique identification information of the authentication device, even when the authentication device continues to be mounted to the mounting component.

6. An information processing device according to claim 5, wherein the control component controls so as to display with prescribed timing on a display component a confirmation message that questions a presence or absence of continued use of a prescribed application program.

7. An information processing device according to claim 1 wherein the first program is configured to perform initialization of the information processing device.

8. An information processing device according to claim 1 wherein the second program is an operating system program for the information processing device.

9. An information processing device according to claim 1 wherein the prescribed value is also stored in the third memory component.

10. An information processing device according to claim 1 wherein the count value designates a period of time for continuous use of the information processing device.

11. An information processing device according to claim 10 wherein the count value is decreased by an amount that is based upon a duration of time that the authentication device is mounted to the mounting component.

12. An information processing device according to claim 11, further comprising:
the first program determining whether the authentication device is mounted to the mounting component.

13. An information processing device according to claim 12, wherein the reading, the referencing, and the performing authentication are performed by the first program.

14. An information processing device according to claim 1, further comprising:
a timer component that uses a system clock to measure how long the second program has run after being started, and sends a timing signal to the control component indicating that a time period for operating the second program has ended.

15. An information processing device that is operable to perform authentication processing and having an authentication device mounted therewith that securely stores unique identification information of the authentication device, comprising:
a mounting component by which the authentication device is mounted;
a first memory component in which a first program is stored;
a second memory component in which a second program is stored;
a third memory component in which is stored a table with a correspondent listing of the unique identification information of the authentication device and a count value; and
a control component for starting, when power is activated, the first program from the first memory component, reading the unique identification information of the authentication device that is mounted to the mounting component, referencing the table, and performing authentication processing for the authentication device, with a condition that the count value correspondingly listed for the unique identification information of the authentication device be larger than a prescribed value and when authentication processing has succeeded, starting the second program from the second memory component, and in the event that the authentication device continues to be mounted to the mounting component during executing the second program, decreasing the count value that corresponds to the unique identification information of the authentication device, wherein the control component, while executing the second program and under a condition that the authentication device is not mounted to the mounting component, increases the count value corresponding to the unique identification information of the authentication device.

16. A authentication control method that performs authentication processing with an information processing device by using an authentication device that securely stores unique identification information of the authentication device, comprising:
a first start step for starting a first program when power for the information processing device is activated;
a judgment step for reading the unique identification information of the authentication device mounted to a mounting component of the information processing device, referencing a table which correspondingly lists the unique identification information of the authentication device and a count value, and judging whether or not the count value correspondingly listed for the unique identification information of the authentication device is larger than a prescribed value;
an authentication processing step for performing authentication processing for the authentication device mounted to the mounting component when the count value from the judgment step is judged to be larger than the prescribed value;
a second start step for starting a second program when authentication processing has succeeded; and
a decrease step for decreasing the count value corresponding to the unique identification information of the authentication device in the event that the authentication device continues to be mounted during executing the second program.

17. A program stored in a memory and is executable by a computer to perform an authentication control method that performs authentication processing with an information processing device by using an authentication device that securely stores unique identification information of the authentication device, comprising:
- a first start step for starting a first program when power for the information processing device is activated;
- a judgment step for reading the unique identification information of the authentication device mounted to a mounting component of the information processing device, referencing a table which correspondingly lists the unique identification information of the authentication device and a count value, and judging whether or not the count value correspondingly listed for the unique identification information of the authentication device is larger than a prescribed value;
- an authentication processing step for performing authentication processing for the authentication device mounted to the mounting component when the count value from the judgment step is judged to be larger than the prescribed value;
- a second start step for starting a second program when authentication processing has succeeded; and
- a decrease step for decreasing the count value corresponding to the unique identification information of the authentication device in the event that the authentication device continues to be mounted during executing the second program.

* * * * *